(12) United States Patent
Ren et al.

(10) Patent No.: US 10,984,040 B2
(45) Date of Patent: Apr. 20, 2021

(54) COLLECTION AND PROVISION METHOD, DEVICE, SYSTEM AND SERVER FOR VEHICLE IMAGE DATA

(71) Applicant: Hangzhou Hikvision Digital Technology Co., Ltd., Zhejiang (CN)

(72) Inventors: Shi Ren, Zhejiang (CN); Lifeng Yu, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 273 days.

(21) Appl. No.: 15/573,603

(22) PCT Filed: May 10, 2016

(86) PCT No.: PCT/CN2016/081560
§ 371 (c)(1),
(2) Date: Nov. 13, 2017

(87) PCT Pub. No.: WO2016/180317
PCT Pub. Date: Nov. 17, 2016

(65) Prior Publication Data
US 2018/0150481 A1    May 31, 2018

(30) Foreign Application Priority Data

May 12, 2015 (CN) .......................... 201510239161.0
May 12, 2015 (CN) .......................... 201510240615.6
Jun. 5, 2015 (CN) .......................... 201510310105.1

(51) Int. Cl.
*G06F 16/58* (2019.01)
*G06F 16/51* (2019.01)
(Continued)

(52) U.S. Cl.
CPC .......... *G06F 16/5866* (2019.01); *G06F 16/51* (2019.01); *G06F 16/955* (2019.01);
(Continued)

(58) Field of Classification Search
CPC .... G06F 16/5866; G06F 16/955; G06F 16/51; G08G 1/0175; G08G 1/017; H04N 5/765
See application file for complete search history.

(56) References Cited

U.S. PATENT DOCUMENTS

2005/0219375 A1    10/2005  Hasegawa et al.
2007/0257985 A1    11/2007  Estevez et al.
(Continued)

FOREIGN PATENT DOCUMENTS

CN    1440005    9/2003
CN    1845198    10/2006
(Continued)

OTHER PUBLICATIONS

EESR dated Dec. 4, 2018; Application No. 16792167.5; 8 pages.
(Continued)

*Primary Examiner* — Aleksandr Kerzhner
*Assistant Examiner* — Aryan D Toughiry
(74) *Attorney, Agent, or Firm* — Mark E. Bandy; Rankin, Hill & Clark LLP

(57) ABSTRACT

Embodiments of the present application disclose a method, device, system and server for acquiring and providing vehicle image data. The method for providing vehicle image data includes: receiving a query request message for vehicle image data which carries unique identification information (S201, S405); obtaining each piece of vehicle image data corresponding to the unique identification information based on the unique identification information and pieces of vehicle image data containing unique identification information stored in an image database, and providing each piece of vehicle image data corresponding to the unique identification information to a user (S202, S406); vehicle image data stored in the image database are sent by an image acquisition device after acquiring the vehicle image data, the (Continued)

vehicle image data acquired by the image acquisition device include image information of a vehicle, and unique identification information of at least one WiFi terminal obtained using a preset WiFi detector when acquiring the image information of the vehicle. In embodiments of the present application, multiple pieces of image information of a vehicle can be correlated and provided to a user together.

18 Claims, 5 Drawing Sheets

(51) Int. Cl.
    *G06F 16/955*     (2019.01)
    *G08G 1/017*     (2006.01)
    *H04N 5/765*     (2006.01)

(52) U.S. Cl.
    CPC ........... *G08G 1/017* (2013.01); *G08G 1/0175* (2013.01); *H04N 5/765* (2013.01)

(56) References Cited

U.S. PATENT DOCUMENTS

| | | |
|---|---|---|
| 2008/0183535 A1 | 7/2008 | Kahana |
| 2012/0294238 A1 | 11/2012 | Uhler et al. |
| 2013/0018705 A1 | 1/2013 | Heath et al. |
| 2013/0300582 A1 | 11/2013 | McNamara et al. |
| 2013/0314273 A1* | 11/2013 | Kavaler .................. G01S 13/92 342/90 |
| 2014/0334796 A1* | 11/2014 | Galant .................. H04N 5/772 386/241 |
| 2015/0029456 A1 | 1/2015 | Ikeda |
| 2015/0054639 A1* | 2/2015 | Rosen ................. H04M 3/2281 340/439 |
| 2015/0154149 A1* | 6/2015 | Liu ........................ G06F 40/103 715/248 |
| 2015/0242708 A1* | 8/2015 | Duan ................... G06K 9/4642 382/159 |
| 2015/0294563 A1 | 10/2015 | Korenaga et al. |
| 2016/0062845 A1* | 3/2016 | Mo ..................... G06F 16/5866 707/685 |
| 2016/0086566 A1* | 3/2016 | Zhu ..................... G06F 16/9577 345/428 |
| 2016/0116915 A1* | 4/2016 | Pulleti ..................... G01S 13/50 701/3 |
| 2016/0163129 A1* | 6/2016 | Elnajjar ............... G07C 5/0866 701/29.6 |

FOREIGN PATENT DOCUMENTS

| | | |
|---|---|---|
| CN | 101887642 | 11/2010 |
| CN | 102368352 | 3/2012 |
| CN | 102610099 | 7/2012 |
| CN | 102968900 | 3/2013 |
| CN | 103747464 | 4/2014 |
| CN | 103818407 | 5/2014 |
| CN | 203659211 | 6/2014 |
| CN | 104219630 | 12/2014 |
| CN | 104295319 | 1/2015 |
| CN | 104469318 | 3/2015 |
| EP | 1742185 A2 | 1/2007 |
| WO | WO 2014/080978 | 5/2014 |

OTHER PUBLICATIONS

CN Office Action dated Jul. 23, 2019; Application No. 201510310105.1; 16 pages.
EP Office Action dated Oct. 7, 2020; Application No. 16792167.5; 7 pages.

\* cited by examiner

COLLECTION AND PROVISION METHOD, DEVICE, SYSTEM AND SERVER FOR VEHICLE IMAGE DATA

The present application claims the priority to a Chinese patent application No. 201510310105.1, filed with State Intellectual Property Office of People's Republic of China on Jun. 5, 2015 and entitled "Method, device, system and server for acquiring and providing vehicle image data", to a Chinese Patent Application No. 201510239161.0, filed with State Intellectual Property Office of People's Republic of China on May 12, 2015 and entitled "Method, device and system for monitoring vehicle based on wireless detection device", and to a Chinese Patent Application No. 201510240615.6, filed with State Intellectual Property Office of People's Republic of China on May 12, 2015 and entitled "Method, device and system for determining trajectory path", which are incorporated herein by reference in their entireties.

TECHNICAL FIELD

The present application relates to the field of communication technology, and particularly to a method, device, system and server for acquiring and providing vehicle image data.

BACKGROUND

With the rapid development of the national economy, the number of vehicles traveling on the road is increasing rapidly, and the traffic pressure is doubled. In order to detect vehicle violations on the road, image acquisition devices are deployed at different locations on the road. The image acquisition device is used to acquire image information of vehicles and sends the same to a data server, the data server provides the image information of vehicles to a user, the user judges whether there are vehicle violations for the vehicles based on the image information of vehicles, providing an effective means for solving or acquiring evidence of a case.

When a vehicle is traveling on a road, multiple pieces of image information of the vehicle are acquired by different image acquisition devices and are stored on a data server. However, in the existing image information acquisition methods, the data server cannot correlate multiple pieces of image information of a vehicle, and can only provide one piece of image information of a vehicle to a user instead of multiple pieces of image information of a vehicle together, whereas one piece of image information provided to the user may be unclear, and the user can't judge whether there are vehicle violations in this vehicle based on this piece of image information or can't identify the detailed information of the vehicle based on this piece of image information.

CONTENTS OF THE INVENTION

Embodiments of the present application disclose a method, device, system and server for acquiring and providing vehicle image data, so as to provide multiple pieces of image information of a vehicle to a user at the same time.

To achieve the above purposes, embodiments of the present application disclose the following technical solutions.

Embodiments of the present application disclose a method for providing vehicle image data, which is applicable to a data server in a vehicle image data acquisition system and includes the following steps:

receiving a query request message for vehicle image data which carries unique identification information of a wireless fidelity WiFi terminal;

obtaining each piece of vehicle image data corresponding to the unique identification information based on the unique identification information and pieces of vehicle image data containing unique identification information stored in an image database, and providing each piece of vehicle image data corresponding to the unique identification information to a user;

wherein, the vehicle image data stored in the image database are sent by an image acquisition device after acquiring the vehicle image data, the vehicle image data acquired by the image acquisition device include image information of a vehicle, and the unique identification information of at least one WiFi terminal obtained using a preset WiFi detector when acquiring the image information of the vehicle.

Embodiments of the present application disclose a method for acquiring vehicle image data, which is applicable to an image acquisition device in a vehicle image data acquisition system and includes the following steps:

acquiring image information of a vehicle, and obtaining unique identification information of at least one WiFi terminal currently located within the WiFi detection area of a preset wireless fidelity WiFi detector using the WiFi detector when acquiring the image information of the vehicle;

correlating the acquired image information of the vehicle with unique identification information of the at least one WiFi terminal obtained when acquiring the image information, so as to generate vehicle image data;

sending the vehicle image data to a data server, such that the data server stores each piece of the vehicle image data containing unique identification information in an image database.

Embodiments of the present application disclose a method for providing vehicle image data, which is applicable to a vehicle image data acquisition system and includes the following steps:

an image acquisition device acquiring image information of a vehicle, obtaining unique identification information of at least one WiFi terminal currently located within the WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information, so as to generate vehicle image data, and sending the vehicle image data to a data server;

after receiving the vehicle image data, the data server storing the vehicle image data in an image database, for unique identification information of each WiFi terminal contained in the vehicle image data;

upon receiving a query request message for vehicle image data which carries the unique identification information of the WiFi terminal, the data server obtaining each piece of vehicle image data corresponding to the unique identification information based on the unique identification information and pieces of vehicle image data containing unique identification information stored in an image database, and providing each piece of vehicle image data corresponding to the unique identification information to a user.

Embodiments of the present application disclose a data server, which is applicable to a vehicle image data acquisition system and includes:

a communication module, used for receiving a query request message for vehicle image data which carries unique identification information of a wireless fidelity WiFi terminal, and informing a data processor of the unique identification information;

a storage, used for storing each piece of vehicle image data containing unique identification information in an image database, wherein vehicle image data stored in the image database are sent by an image acquisition device to the data server after acquiring the vehicle image data, the vehicle image data acquired by the image acquisition device include image information of a vehicle, and unique identification information of at least one WiFi terminal obtained using a preset WiFi detector when acquiring the image information of the vehicle;

a data processor, used for receiving the unique identification information from the communication module, and after receiving the unique identification information, querying each piece of the vehicle image data containing unique identification information stored in the image database, using the unique identification information to obtain each piece of vehicle image data corresponding to the unique identification information, and providing each piece of vehicle image data corresponding to the unique identification information to a user.

Embodiments of the present application disclose an image acquisition device, which is applicable to a vehicle image data acquisition system and includes:

an image capturing module, used for acquiring image information of a vehicle and informing an image processor of the image information of the vehicle;

a wireless fidelity WiFi detector, used for obtaining unique identification information of at least one WiFi terminal currently located within the WiFi detection area of the WiFi detector and informing the image processor of the unique identification information of the at least one WiFi terminal:

an image processor, used for receiving the image information of the vehicle from the image capturing module, receiving unique identification information of the at least one WiFi terminal from the WiFi detector, correlating the acquired image information of the vehicle with unique identification information of the at least one WiFi terminal obtained when acquiring the image information so as to generate vehicle image data, and informing a communication module of the vehicle image data.

the communication module, used for receiving the vehicle image data from the image processor, and sending the vehicle image data to a data server, such that the data server stores each piece of vehicle image data containing unique identification information in an image database.

Embodiments of the present application disclose a system for providing vehicle image data, which includes:

an image acquisition device, used for acquiring image information of a vehicle, and obtaining unique identification information of at least one WiFi terminal currently located within the WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information so as to generate vehicle image data, and sending the vehicle image data to a data server.

the data server, used for, after receiving the vehicle image data, storing the vehicle image data in an image database, for unique identification information of each WiFi terminal contained in the vehicle image data; upon receiving a query request message for vehicle image data which carries the unique identification information of the WiFi terminal, obtaining each piece of vehicle image data corresponding to the unique identification information based on the unique identification information and pieces of vehicle image data containing unique identification information stored in an image database, and providing each piece of vehicle image data corresponding to the unique identification information to a user.

Embodiments of the present application disclose an application program, which is used for implementing the method for providing vehicle image data described above when being executed.

Embodiments of the present application disclose a storage medium, which is used to store an application program, the application program is used to implement the method for providing vehicle image data described above.

Embodiments of the present application disclose an application program, which is used to implement the method for acquiring vehicle image data described above when being executed.

Embodiments of the present application disclose a storage medium, which is used to store an application program, the application program is used to implement the method for acquiring vehicle image data described above.

Based on the above technical solution, when compared to the prior art, embodiments of the present application at least have the following advantages: in the embodiments of the present application, by arranging a WiFi detector on an image acquisition device, the image acquisition device obtains unique identification information of at least one WiFi terminal located within the WiFi detection area of the image acquisition device when acquiring image information of the vehicle, and combines the image information of the vehicle and the unique identification information of at least one WiFi terminal into vehicle image data, such that the data server can correlate multiple pieces of image information of the vehicle based on the unique identification information in the vehicle image data, and provide multiple pieces of image information of the vehicle together to a user, so that the user can select clearer image data from multiple pieces of image information of the vehicle, and judge whether the vehicle has vehicle violations based on this piece of image information or identify the detailed information of the vehicle based on this piece of image information.

BRIEF DESCRIPTION OF THE DRAWINGS

In order to describe the embodiments of the present application and the technical solutions in the prior art more clearly, drawings required for embodiments of the present application and the prior art will be described briefly below. It is obvious that the drawings below are for only some embodiments of the present application, and those skilled in the art can also obtain other drawings based on these drawings without any creative efforts.

DETAILED DESCRIPTION

In order to make the purposes, technical solutions as well as advantages of the present application more apparent and understandable, the present application will be described in further detail below with reference to the accompanying drawings and embodiments. Obviously, the described embodiments are only some of the embodiments of the present application, and not all of the embodiments. All other embodiments obtained by those skilled in the art without any creative efforts, based on the embodiments of the present application, are within the scope of the present application.

First Embodiment

Figure 1:
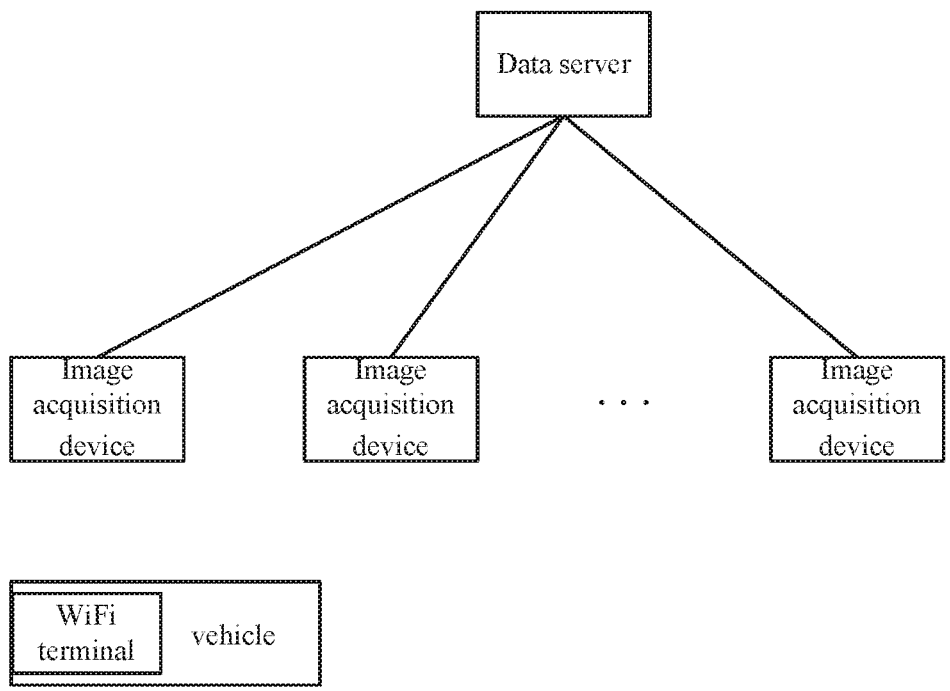
FIG. 1 is a schematic structural diagram of a system provided in the first embodiment of the present application.

In view of the existing problems in the prior art, there is provided a method for providing vehicle image data according to the first embodiment of the present application. FIG. 1 is a schematic structural diagram of the system in this embodiment of the present application, the method is applicable to a vehicle image data acquisition system including an image acquisition device, a vehicle provided with a WiFi terminal, and a data server.

In embodiments of the present application, a WiFi detector can be a WiFi detector built in an image acquisition device, and can also be a WiFi detector deployed separately from an image acquisition device, for ease of description, a WiFi detector built in an image acquisition device is taken as an example. Based on this WiFi detector, the image acquisition device, after receiving a WiFi signal (which can be a broadcast message) from a WiFi terminal, can analyze this WiFi signal to obtain unique identification information of the WiFi terminal, and the unique identification information of the WiFi terminal includes but not limited to media access control (MAC) address of the WiFi terminal. Further, based on this WiFi detector, the image acquisition device, after receiving a WiFi signal from a WiFi terminal, may not response to the WiFi terminal and not provide WiFi services for the WiFi terminal, as long as it can analyze this WiFi signal to obtain unique identification information of the WiFi terminal carried in this WiFi signal. Image acquisition devices are arranged in various roads according to practical requirements, and each image acquisition device has corresponding geographical coordinates. Further, an image acquisition device can be an intelligent traffic camera with image capturing function.

In embodiments of the present application, the WiFi terminal can be a mobile terminal provided with a WiFi module, and the WiFi module can be a WiFi module at a user's side, such as a general WiFi module used in a mobile terminal, a laptop computer, and a tablet computer. Based on this WiFi module, a WiFi terminal periodically sends WiFi signals, and the WiFi signals carry unique identification information of the WiFi terminal.

Wherein, a vehicle provided with a WiFi terminal means that a WiFi terminal is placed in the vehicle. When a WiFi terminal is placed in the vehicle, the WiFi terminal may be placed at a certain location in the vehicle, or the WiFi terminal is carried by a user in the vehicle.

A data server is used to store vehicle image data in an image database.

Figure 2:
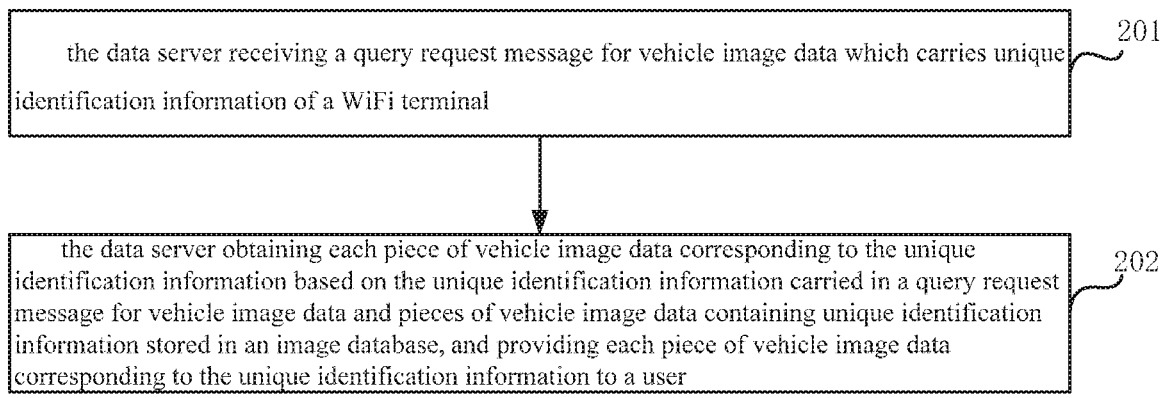
FIG. 2 is a schematic flowchart of a method for providing vehicle image data provided in the first embodiment of the present application.

In the above application scenario, as shown in FIG. 2, the method for providing vehicle image data includes the following steps:

Step 201, a data server receiving a query request message for vehicle image data which carries unique identification information of a WiFi terminal.

Wherein, if a user knows that a vehicle corresponding to unique identification information of a certain WiFi terminal is likely to have vehicle violations, it is determined that the vehicle image data corresponding to the unique identification information of this WiFi terminal need to be queried, then the data server can receive a query request message for vehicle image data that carries the unique identification information of this WiFi terminal. Alternatively, the data server may automatically send the vehicle image data to a user when it is found that a vehicle corresponding to certain vehicle image data is likely to have vehicle violations, the user can separate the image information of the vehicle in the vehicle image data from the unique identification information of at least one WiFi terminal after obtaining the vehicle image data, i.e., extract unique identification information of at least one WiFi terminal from the vehicle image data, find out a vehicle corresponding to the unique identification information of at least one WiFi terminal is likely to have vehicle violations based on the extracted unique identification information of at least one WiFi terminal, and determine the vehicle image data corresponding to the unique identification information of the at least one WiFi terminal need to be queried, for the unique identification information of each WiFi terminal among the unique identification information of at least one WiFi terminal, the data server can receive a query request message for vehicle image data that carries the unique identification information of this WiFi terminal.

In a specific application, the system structure shown in FIG. 1 can further include a user platform for querying vehicle image data. Based on this user platform, if a user find out that a vehicle corresponding to unique identification information of a certain WiFi terminal possibly is likely to have vehicle violations, then it is determined that the vehicle image data corresponding to the unique identification information of this WiFi terminal need to be queried, and input a vehicle image data querying command that carries the unique identification information of this WiFi terminal into the user platform, after receiving the vehicle image data querying command, the user platform analyzes the unique identification information of this WiFi terminal from the vehicle image data querying command, and sends, to the data server, the query request message for vehicle image data that carries the unique identification information of this WiFi terminal. Alternatively, the data server may automatically send the vehicle image data to a user platform when it is found that a vehicle corresponding to certain vehicle image data is likely to have vehicle violations, the user platform can separate the image information of the vehicle in the vehicle image data from the unique identification information of at least one WiFi terminal after obtaining the vehicle image data, i.e., extract unique identification information of at least one WiFi terminal from the vehicle image data, find out a vehicle corresponding to the unique identification information of at least one WiFi terminal is likely to have vehicle violations based on the extracted unique identification information of at least one WiFi terminal, and determine the vehicle image data corresponding to the unique identification information of the at least one WiFi terminal need to be queried; for the unique identification information of each WiFi terminal among the unique identification information of at least one WiFi terminal, the user platform sends a query request message for vehicle image data that carries the unique identification information of this WiFi terminal to the data server.

Step 202, the data server obtaining each piece of vehicle image data corresponding to the unique identification information based on the unique identification information carried in a query request message for vehicle image data and pieces of vehicle image data containing unique identification information stored in an image database, and providing each piece of vehicle image data corresponding to the unique identification information to a user. If the data server sends each piece of vehicle image data to a user platform, and a user can obtain each piece of the vehicle image data on the user platform, so that the user can select the clearer vehicle image data from multiple pieces of image information of the vehicle, and judge whether the vehicle has vehicle violations based on the vehicle image data or identify the detailed information of the vehicle based on this piece of image information.

In embodiments of the present application, the vehicle image data stored in the image database are sent by an image acquisition device to a data server after acquiring the vehicle image data, the vehicle image data acquired by the image acquisition device include image information of the vehicle, and unique identification information of at least one WiFi terminal obtained using a preset WiFi detector when acquiring the image information of the vehicle.

In embodiments of the present application, the data server, after receiving the vehicle image data, stores the vehicle image data in an image database, for unique identification information of each WiFi terminal contained in the vehicle image data. As shown table 1, an example of an image database is illustrated, in which vehicle image data 1, vehicle image data 2 are stored for unique identification information of a WiFi terminal 1, and vehicle image data 1 and vehicle image data 3 are stored for unique identification information of a WiFi terminal 2.

TABLE 1

| unique identification information of a WiFi terminal | vehicle image data |
| --- | --- |
| unique identification information of a WiFi terminal 1 | vehicle image data 1, vehicle image data 2 |
| unique identification information of a WiFi terminal 2 | vehicle image data 1, vehicle image data 3 |

In embodiments of the present application, the process of the data server storing the vehicle image data in an image database, for unique identification information of each WiFi terminal contained in the vehicle image data includes but is not limited to: after receiving the vehicle image data from the image acquisition device, the data server analyzes the vehicle image data to obtain each piece of the unique identification information; for each piece of unique identification information, the data server judges whether this piece of unique identification information is stored in the image database; if so, the data server stores the vehicle image data for this piece of unique identification information; otherwise, the data server stores this piece of unique identification information in the image database, and stores the vehicle image data for this piece of unique identification information.

For example, after receiving vehicle image data 4 from an image acquisition device, the data server analyzes the vehicle image data 4 to obtain unique identification information of the WiFi terminal 1 and unique identification information of the WiFi terminal 2. For the unique identification information of the WiFi terminal 1, vehicle image data 4 are directly stored as shown in Table 2 since the unique identification information of the WiFi terminal 1 is stored in the image database as shown in Table 1. For the unique identification information of the WiFi terminal 3, it is stored in the image database as shown in Table 2, and the vehicle image data 4 is stored as shown in Table 3 for the unique identification information of the WiFi terminal 3 since the unique identification information of the WiFi terminal 3 is not stored in the image database as shown in Table 2.

TABLE 2

| unique identification information of a WiFi terminal | vehicle image data |
| --- | --- |
| unique identification information of a WiFi terminal 1 | vehicle image data 1, vehicle image data 2, vehicle image data 4 |
| unique identification information of a WiFi terminal 2 | vehicle image data 1, vehicle image data 3 |

TABLE 3

| unique identification information of a WiFi terminal | vehicle image data |
| --- | --- |
| unique identification information of a WiFi terminal 1 | vehicle image data 1, vehicle image data 2, vehicle image data 4 |
| unique identification information of a WiFi terminal 2 | vehicle image data 1, vehicle image data 3 |
| unique identification information of a WiFi terminal 3 | vehicle image data 4 |

Further, unique identification information carried in a query request message for vehicle image data is the unique identification information of the WiFi terminal 1, and each piece of the vehicle image data stored in the image database for the unique identification information of each WiFi terminal is as shown in Table 3, then the data server queries Table 3 through the unique identification information of the WiFi terminal 1 so as to obtain that the vehicle image data corresponding to the unique identification information of the WiFi terminal 1 are vehicle image data 1, vehicle image data 2 and vehicle image data 4. The vehicle image data 1, vehicle image data 2 and vehicle image data 4 are sent to the user platform by the data server and can be obtained by a user on the user platform, and the user can select clearer vehicle image data from the vehicle image data 1, vehicle image data 2 and vehicle image data 4.

In embodiments of the present application, after the data server obtaining each piece of vehicle image data corresponding to the unique identification information based on the unique identification information and pieces of vehicle image data containing unique identification information stored in an image database, the data server can also determine an image acquisition device which corresponds to each piece of vehicle image data corresponding to the unique identification information, and analyze trajectory information of the vehicle based on the order in which the determined image acquisition devices acquired pieces of vehicle image data corresponding to the unique identification information, and the installation locations of the determined image acquisition devices. For example, after data server obtaining the vehicle image data 1, vehicle image data 2 and vehicle image data 4 corresponding to the unique identification information of the WiFi terminal 1, it is also possible to determine an image acquisition device 1 corresponding to the vehicle image data 1, an image acquisition device 2 corresponding to the vehicle image data 2, an image acquisition device 3 corresponding to the vehicle image data 4, wherein the vehicle image data carries geographical coordinate information of image acquisition devices and shooting time information when the WiFi terminal is captured. Assuming that the image acquisition device 1 first acquires the vehicle image data 1, and then the image acquisition device 2 acquires the vehicle image data 2, after that the image acquisition device 3 acquires vehicle image data 4, then the trajectory information of the WiFi terminal 1 is the trajectory from location of the image acquisition device 1 to location of the image acquisition device 2 and to location of the image acquisition device 3.

In embodiments of the present application, the vehicle image data can further include information about license plate numbers, after analyzing and obtaining the trajectory of the WiFi terminal 1, it is also possible to analyze the trajectory of a vehicle associated with the WiFi terminal 1 in combination with information about license plate numbers in various vehicle image data. The data server can obtain each piece of the vehicle image data corresponding to the information about license plate numbers and provide the same to a user, its process will not be repeatedly described in detail.

Based on the above technical solution, when compared to the prior art, embodiments of the present application at least have the following advantages: in the embodiments of the present application, by arranging a WiFi detector on an image acquisition device, the image acquisition device obtains unique identification information of at least one WiFi terminal located within the WiFi detection area of the image acquisition device when acquiring image information of the vehicle, and combines the image information of the vehicle and the unique identification information of at least one WiFi terminal into vehicle image data, such that the data server can correlate multiple pieces of image information of the vehicle based on the unique identification information in the vehicle image data, and provide multiple pieces of image information of the vehicle together to a user, so that the user can select clearer image data from multiple pieces of image information of the vehicle, and judge whether the vehicle has vehicle violations based on this piece of image information or identify the detailed information of the vehicle based on this piece of image information.

Second Embodiment

There is provided a method for acquiring vehicle image data according to the second embodiment of the present application. FIG. 1 is a schematic structural diagram of a system in this embodiment of the present application, the method can be applied to a vehicle image data acquisition system including an image acquisition device, a vehicle provided with a WiFi terminal, and a data server.

In embodiments of the present application, a WiFi detector can be a WiFi detector built in an image acquisition device, and can also be a WiFi detector deployed separately from an image acquisition device, for ease of description, a WiFi detector built in an image acquisition device is taken as an example. Based on this WiFi detector, the image acquisition device, after receiving a WiFi signal (which can be a broadcast message) from a WiFi terminal, can analyze this WiFi signal to obtain unique identification information of the WiFi terminal, and the unique identification information of the WiFi terminal includes but not limited to media access control (MAC) address of the WiFi terminal. Further, based on this WiFi detector, the image acquisition device, after receiving a WiFi signal from a WiFi terminal, may not response to the WiFi terminal and not provide WiFi services for the WiFi terminal, as long as it can analyze this WiFi signal to obtain unique identification information of the WiFi terminal carried in this WiFi signal. Further, an image acquisition device can be an intelligent traffic camera with image capturing function.

In embodiments of the present application, the WiFi terminal can be a mobile terminal provided with a WiFi module, and the WiFi module can be a WiFi module at a user's side, such as a general WiFi module used in a mobile terminal, a laptop computer, and a tablet computer. Based on this WiFi module, a WiFi terminal periodically sends WiFi signals, and the WiFi signals carry unique identification information of the WiFi terminal.

Wherein, a vehicle provided with a WiFi terminal means that a WiFi terminal is placed in the vehicle. When a WiFi terminal is placed in the vehicle, the WiFi terminal may be placed at a certain location in the vehicle, or the WiFi terminal is carried by a user in the vehicle.

The data server is used to store vehicle image data in an image database.

Figure 3:
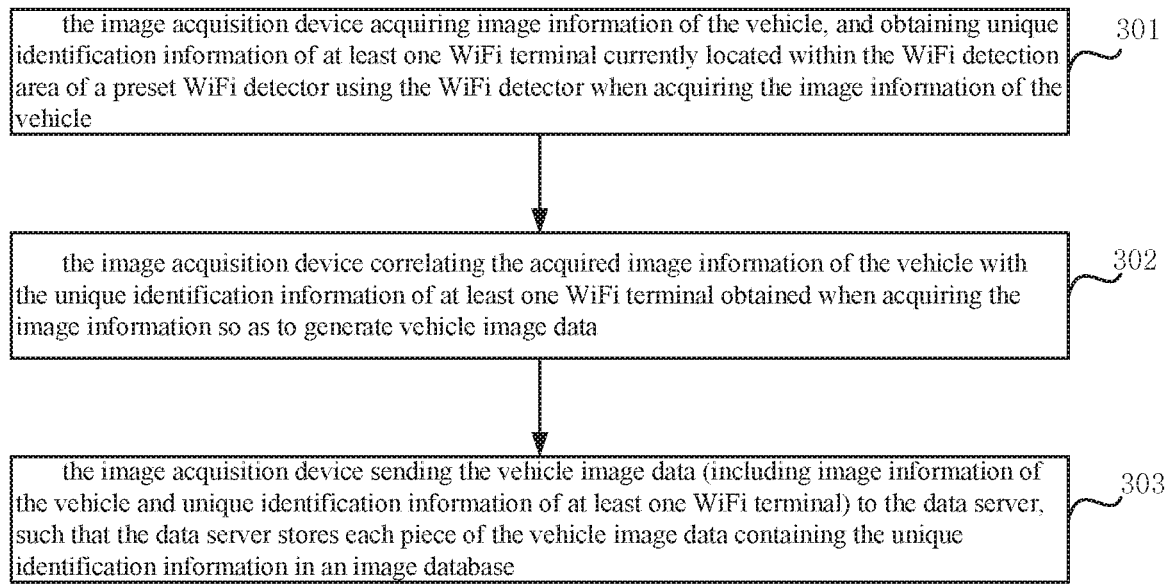
FIG. 3 is a schematic flowchart of a method for acquiring vehicle image data provided in the second embodiment of the present application.

In the above application scenario, as shown in FIG. 3, the method for acquiring vehicle image data includes the following steps:

Step 301, the image acquisition device acquiring image information of the vehicle, and obtaining unique identification information of at least one WiFi terminal currently located within the WiFi detection area of a preset WiFi detector using the WiFi detector when acquiring the image information of the vehicle, wherein the unique identification information includes but is not limited to MAC addresses.

Wherein, when a vehicle is located within an acquisition area of an image acquisition device, the image acquisition device can acquire image information of this vehicle, e.g., acquire image information such as the license plate number of this vehicle, whether the vehicle runs a red light.

In embodiments of the present application, the WiFi terminal located in a vehicle will periodically send a WiFi signal, the WiFi signal carries unique identification information of this WiFi terminal and includes but is not limited to Beacon frame. On this basis, the image acquisition device can receive a WiFi signal sent by at least one WiFi terminal currently located within the WiFi detection area of a preset WiFi detector using the WiFi detector when acquiring image information of this vehicle, and obtain unique identification information of the at least one WiFi terminal from the at least WiFi signal. For example, when an image acquisition device acquires image information of a vehicle A, a WiFi terminal 1 within the vehicle A is located within the WiFi detection area of the image acquisition device at acquisition moment when the image information of the vehicle A is acquired, when the WiFi terminal 1 sends the WiFi signal carrying unique identification information of this WiFi terminal, the image acquisition device can obtain the unique identification information of the WiFi terminal 1 from the WiFi signal sent by the WiFi terminal 1. For another example, when an image acquisition device acquires image information of a vehicle A, a WiFi terminal 1 within the vehicle A and a WiFi terminal 2 within a vehicle B are both located within the WiFi detection area of the image acquisition device at acquisition moment when the image information of the vehicle A is acquired, when the WiFi terminal 1 and the WiFi terminal 2 both send the WiFi signals carrying unique identification information of their WiFi terminals, the image acquisition device can obtain the unique identification information of the WiFi terminal 1 from the WiFi signal sent by the WiFi terminal 1 and obtain the unique identification information of the WiFi terminal 2 from the WiFi signal sent by the WiFi terminal 2.

Step 302, the image acquisition device correlating the acquired image information of the vehicle with the unique identification information of at least one WiFi terminal obtained when acquiring the image information so as to generate vehicle image data.

In embodiments of the present application, the process of the image acquisition device correlating the acquired image information of the vehicle with the unique identification information of at least one WiFi terminal obtained when acquiring the image information so as to generate vehicle image data, includes but is not limited to: the image acquisition device determining acquisition moment when the image information of the vehicle is acquired, and determining obtainment moment when the unique identification information of at least one WiFi terminal is obtained, when the difference between the acquisition moment and the obtainment moment does not exceed a preset threshold, correlating, via the image acquisition device, the acquired image information of the vehicle with the obtained unique identification information of the at least one WiFi terminal, so as to generate vehicle image data. Wherein, the acquisition moment when image information of a vehicle is acquired and the obtainment moment when unique identification information of at least one WiFi terminal is obtained are the same, and there can be a certain error therebetween, but this error cannot exceed a preset threshold, for example, the error is not more than 1 second. For example, an image acquisition device acquires image information of the vehicle A at 17:30:00:00 on May 28, 2015, and obtains unique identification information of the WiFi terminal 1 (located within the vehicle A) at 17:30:00:05 on May 28, 2015, since the error between the acquisition moment (17:30:00:00, May 28, 2015) and the obtainment moment (17:30:01:05, May 28, 2015) is 5 milliseconds, which is within a preset threshold, the image acquisition device can correlate the acquired image information of the vehicle A with the unique identification information of the WiFi terminal 1 to generate vehicle image data.

In embodiments of the present application, the process of the image acquisition device correlating the acquired image information of the vehicle with the unique identification information of at least one WiFi terminal obtained when acquiring the image information so as to generate vehicle image data, includes but is not limited to: when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

In embodiments of the present application, the image acquisition device correlating, the acquired image information of the vehicle with the unique identification information of at least one WiFi terminal obtained when acquiring the image information so as to generate vehicle image data means that: the image acquisition device combines the image information of the vehicle and the unique identification information of at least one WiFi terminal together, e.g., encapsulated in the same data, so as to generate vehicle image data, i.e., the vehicle image data includes the image information of the vehicle and the unique identification information of at least one WiFi terminal.

For example, when image information of the vehicle A is bound to the unique identification information of the WiFi terminal 1, the image acquisition device combines the image information of the vehicle A and the unique identification information of the WiFi terminal 1 together so as to generate vehicle image data. For another example, when image information of the vehicle A is bound to the unique identification information of the WiFi terminal 1 and unique identification information of the WiFi terminal 2, the image acquisition device combines the image information of the vehicle A, and the unique identification information of the WiFi terminal 1, the unique identification information of the WiFi terminal 2 together so as to generate vehicle image data.

Step 303, the image acquisition device sending the vehicle image data (including image information of the vehicle and unique identification information of at least one WiFi terminal) to the data server, such that the data server stores each piece of the vehicle image data containing the unique identification information in an image database.

Based on the above technical solution, when compared to the prior art, the embodiments of the present application at least have the following advantages: in the embodiments of the present application, by arranging a WiFi detector on an image acquisition device, the image acquisition device obtains unique identification information of at least one WiFi terminal located within the WiFi detection area of the image acquisition device when acquiring image information of the vehicle, combines the image information of the vehicle and the unique identification information of at least one WiFi terminal into vehicle image data, and sends the same to the data server.

Third Embodiment

There is provided a method for providing vehicle image data according to the third embodiment of the present application. FIG. 1 is a schematic structural diagram of a system in this embodiment of the present application, the method is applicable to a vehicle image data acquisition system including an image acquisition device, a vehicle provided with a WiFi terminal, and a data server.

In embodiments of the present application, a WiFi detector can be a WiFi detector built in an image acquisition device, and can also be a WiFi detector deployed separately from an image acquisition device, for ease of description, a WiFi detector built in an image acquisition device is taken as an example. Based on this WiFi detector, the image acquisition device, after receiving a WiFi signal (which can be a broadcast message) from a WiFi terminal, can analyze this WiFi signal to obtain unique identification information of the WiFi terminal, and the unique identification information of the WiFi terminal includes but not limited to media access control (MAC) address of the WiFi terminal. Further, based on this WiFi detector, the image acquisition device, after receiving a WiFi signal from a WiFi terminal, may not response to the WiFi terminal and not provide WiFi services for the WiFi terminal, as long as it can analyze this WiFi signal to obtain unique identification information of the WiFi terminal carried in this WiFi signal. Further, an image acquisition device can be an intelligent traffic camera with image capturing function.

In embodiments of the present application, the WiFi terminal can be a mobile terminal provided with a WiFi module, and the WiFi module can be a WiFi module at a user's side, such as a general WiFi module used in a mobile terminal, a laptop computer, and a tablet computer. Based on this WiFi module, a WiFi terminal periodically sends WiFi signals, and the WiFi signals carry unique identification information of the WiFi terminal.

Wherein, a vehicle provided with a WiFi terminal means that a WiFi terminal is placed in the vehicle. When a WiFi terminal is placed in the vehicle, the WiFi terminal may be placed at a certain location in the vehicle, or the WiFi terminal is carried by a user in the vehicle.

The data server is used to store vehicle image data in an image database.

Figure 4:
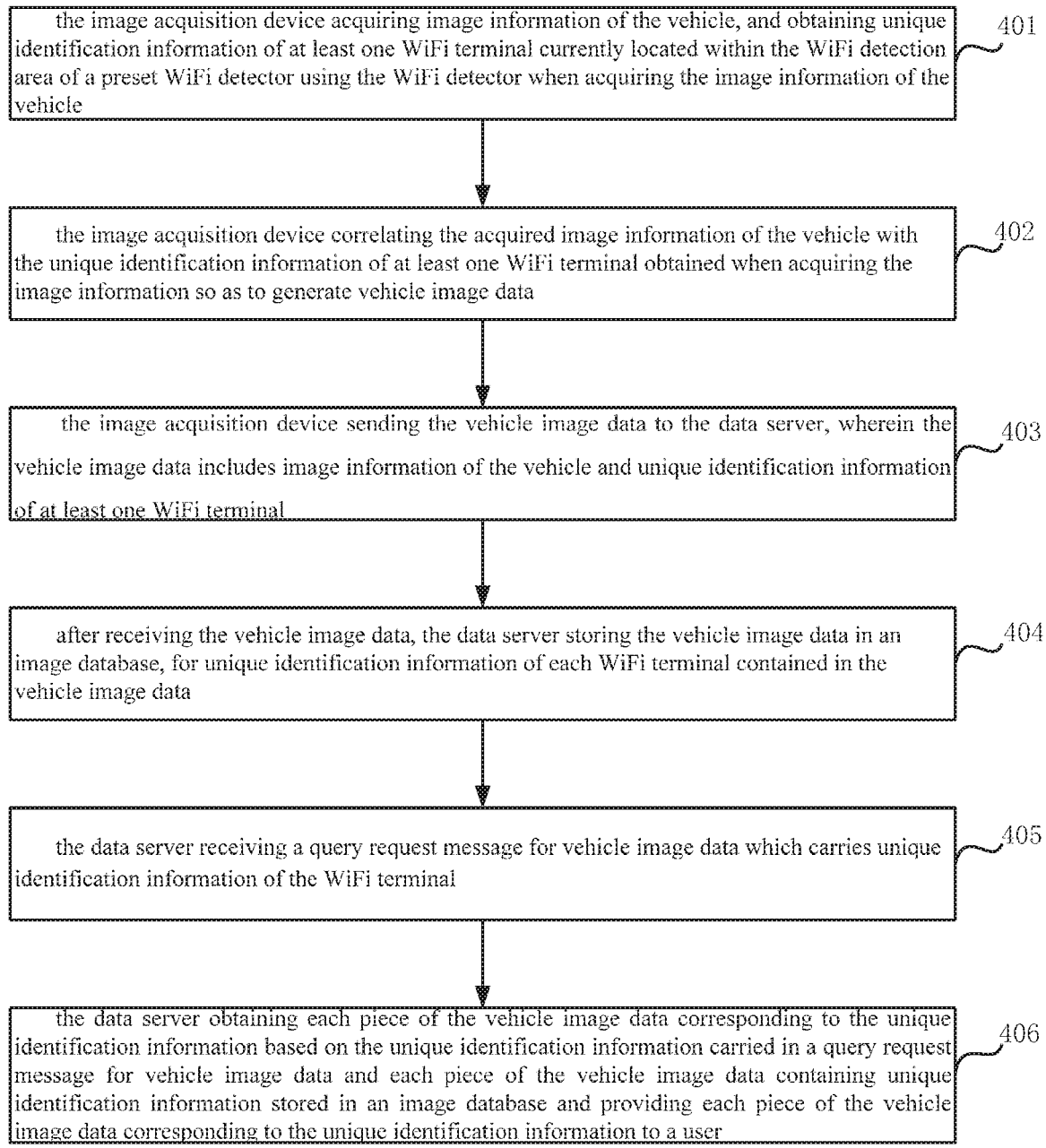
FIG. 4 is a schematic flowchart of a method for providing vehicle image data provided in the third embodiment of the present application.

In the above application scenario, as shown in FIG. 4, the method for providing vehicle image data includes the following steps:

Step 401, the image acquisition device acquiring image information of the vehicle, and obtaining unique identification information of at least one WiFi terminal currently located within the WiFi detection area of a preset WiFi detector using the WiFi detector when acquiring the image information of the vehicle, wherein the unique identification information includes but is not limited to MAC addresses.

Wherein, when a vehicle is located within an acquisition area of an image acquisition device, the image acquisition device can acquire image information of this vehicle, e.g., acquire image information such as the license plate number of this vehicle, whether the vehicle runs a red light.

In embodiments of the present application, the WiFi terminal located in a vehicle will periodically send a WiFi signal, the WiFi signal carries unique identification information of this WiFi terminal and includes but is not limited to Beacon frame. On this basis, the image acquisition device can receive a WiFi signal sent by at least one WiFi terminal currently located within the WiFi detection area of a preset WiFi detector using the WiFi detector when acquiring image information of this vehicle, and obtain unique identification information of the at least one WiFi terminal from the at least WiFi signal. For example, when an image acquisition device acquires image information of a vehicle A, a WiFi terminal 1 within the vehicle A is located within the WiFi detection area of the image acquisition device at acquisition moment when the image information of the vehicle A is acquired, when the WiFi terminal 1 sends the WiFi signal carrying unique identification information of this WiFi terminal, the image acquisition device can obtain the unique identification information of the WiFi terminal 1 from the WiFi signal sent by the WiFi terminal 1. For another example, when an image acquisition device acquires image information of a vehicle A, a WiFi terminal 1 within the vehicle A and a WiFi terminal 2 within a vehicle B are both located within the WiFi detection area of the image acquisition device at acquisition moment when the image information of the vehicle A is acquired, when the WiFi terminal 1 and the WiFi terminal 2 both send the WiFi signals carrying unique identification information of their WiFi terminals, the image acquisition device can obtain the unique identification information of the WiFi terminal 1 from the WiFi signal sent by the WiFi terminal 1 and obtain the unique identification information of the WiFi terminal 2 from the WiFi signal sent by the WiFi terminal 2.

Step 402, the image acquisition device correlating the acquired image information of the vehicle with the unique identification information of at least one WiFi terminal obtained when acquiring the image information so as to generate vehicle image data.

In embodiments of the present application, the process of the image acquisition device correlating the acquired image information of the vehicle with the unique identification information of at least one WiFi terminal obtained when acquiring the image information so as to generate vehicle image data, includes but is not limited to: the image acquisition device determining acquisition moment when the image information of the vehicle is acquired, and determining obtainment moment when the unique identification information of at least one WiFi terminal is obtained, when the difference between the acquisition moment and the obtainment moment does not exceed a preset threshold, correlating, via the image acquisition device, the acquired image information of the vehicle with the obtained unique identification information of the at least one WiFi terminal, so as to generate vehicle image data. Wherein, the acquisition moment when image information of a vehicle is acquired and the obtainment moment when unique identification information of at least one WiFi terminal is obtained are the same, and there can be a certain error there between, but this error cannot exceed a preset threshold, for example, the error is not more than 1 second. For example, an image acquisition device acquires image information of the vehicle A at 17:30:00:00 on May 28, 2015, and obtains unique identification information of the WiFi terminal 1 (located within the vehicle A) at 17:30:00:05 on May 28, 2015, since the error between the acquisition moment (17:30:00:00, May 28, 2015) and the obtainment moment (17:30:01:05, May 28, 2015) is 5 milliseconds, which is within a preset threshold, the image acquisition device can correlate the acquired image information of the vehicle A with the unique identification information of the WiFi terminal 1 to generate vehicle image data.

In embodiments of the present application, the process of the image acquisition device correlating the acquired image information of the vehicle with the unique identification information of at least one WiFi terminal obtained when acquiring the image information so as to generate vehicle image data, includes but is not limited to: when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

In embodiments of the present application, the image acquisition device correlating the acquired image information of the vehicle with the unique identification information of at least one WiFi terminal obtained when acquiring the image information so as to generate vehicle image data means that: the image acquisition device combines the image information of the vehicle and the unique identification information of at least one WiFi terminal together, e.g., encapsulated in the same data, so as to generate vehicle image data, i.e., the vehicle image data includes the image information of the vehicle and the unique identification information of at least one WiFi terminal.

For example, when image information of the vehicle A is bound to the unique identification information of the WiFi terminal 1, the image acquisition device combines the image information of the vehicle A and the unique identification information of the WiFi terminal 1 together so as to generate vehicle image data. For another example, when image information of the vehicle A is bound to the unique identification information of the WiFi terminal 1 and unique identification information of the WiFi terminal 2, the image acquisition device combines the image information of the vehicle A, and the unique identification information of the WiFi terminal 1, the unique identification information of the WiFi terminal 2 together so as to generate vehicle image data.

Step 403, the image acquisition device sending the vehicle image data to the data server, wherein the vehicle image data includes image information of the vehicle and unique identification information of at least one WiFi terminal.

Step 404, after receiving the vehicle image data, the data server storing the vehicle image data in an image database, for unique identification information of each WiFi terminal contained in the vehicle image data.

As shown FIG. 4, an example of an image database is illustrated, in which vehicle image data 1, vehicle image data 2 are stored for unique identification information of a WiFi terminal 1, and vehicle image data 1 and vehicle image data 3 are stored for unique identification information of a WiFi terminal 2.

TABLE 4

| unique identification information of a WiFi terminal | vehicle image data |
|---|---|
| unique identification information of a WiFi terminal 1 | vehicle image data 1, vehicle image data 2 |
| unique identification information of a WiFi terminal 2 | vehicle image data 1, vehicle image data 3 |

In embodiments of the present application, the process of the data server storing the vehicle image data in an image database, for unique identification information of each WiFi terminal contained in the vehicle image data includes but is not limited to: after receiving vehicle image data from the image acquisition device, the data server analyzing the vehicle image data to obtain each piece of the unique identification information; for each piece of unique identification information, the data server judging whether this piece of unique identification information is stored in the image database; if so, storing the vehicle image data for this piece of unique identification information; otherwise, storing this piece of unique identification information in the image database, and storing the vehicle image data for this piece of unique identification information.

For example, after receiving vehicle image data 4 from the image acquisition device, the data server analyzing the vehicle image data 4 to obtain unique identification information of a WiFi terminal 1 and unique identification information of a WiFi terminal 3. For the unique identification information of the WiFi terminal 1, vehicle image data 4 are directly stored as shown in Table 5 since the unique identification information of the WiFi terminal 4 is stored in the image database as shown in Table 1. For the unique identification information of the WiFi terminal 3, it is stored in the image database as shown in Table 5, and the vehicle image data 4 are stored as shown in Table 6 for the unique identification information of the WiFi terminal 3 since the unique identification information of the WiFi terminal 3 is not stored in the image database as shown in Table 5.

TABLE 5

| unique identification information of a WiFi terminal | vehicle image data |
|---|---|
| unique identification information of a WiFi terminal 1 | vehicle image data 1, vehicle image data 2, vehicle image data 4 |
| unique identification information of a WiFi terminal 2 | vehicle image data 1, vehicle image data 3 |

TABLE 6

| unique identification information of a WiFi terminal | vehicle image data |
|---|---|
| unique identification information of a WiFi terminal 1 | vehicle image data 1, vehicle image data 2, vehicle image data 4 |
| unique identification information of a WiFi terminal 2 | vehicle image data 1, vehicle image data 3 |
| unique identification information of a WiFi terminal 3 | vehicle image data 4 |

Step 405, the data server receiving a query request message for vehicle image data which carries unique identification information of the WiFi terminal.

Wherein, if a user knows that a vehicle corresponding to unique identification information of a certain WiFi terminal is likely to have vehicle violations, it is determined that the vehicle image data corresponding to the unique identification information of this WiFi terminal need to be queried, then the data server can receive a query request message for vehicle image data that carries the unique identification information of this WiFi terminal. Alternatively, the data server may automatically send the vehicle image data to a user when it is found that a vehicle corresponding to certain vehicle image data is likely to have vehicle violations, the user can separate the image information of the vehicle in the vehicle image data from the unique identification information of at least one WiFi terminal after obtaining the vehicle image data, i.e., extract unique identification information of at least one WiFi terminal from the vehicle image data, find out a vehicle corresponding to the unique identification information of at least one WiFi terminal is likely to have vehicle violations based on the extracted unique identification information of at least one WiFi terminal, and determine the vehicle image data corresponding to the unique identification information of the at least one WiFi terminal need to be queried, for the unique identification information of each WiFi terminal among the unique identification information of at least one WiFi terminal, the data server can receive a query request message for vehicle image data that carries the unique identification information of this WiFi terminal.

In a specific application, the system structure shown in FIG. 1 can further include a user platform for querying vehicle image data. Based on this user platform, if a user find out that a vehicle corresponding to unique identification information of a certain WiFi terminal possibly is likely to have vehicle violations, then it is determined that the vehicle image data corresponding to the unique identification information of this WiFi terminal need to be queried, and input a vehicle image data querying command that carries the unique identification information of this WiFi terminal into the user platform, after receiving the vehicle image data querying command, the user platform analyzes the unique identification information of this WiFi terminal from the vehicle image data querying command, and sends, to the data server, the query request message for vehicle image data that carries the unique identification information of this WiFi terminal. Alternatively, the data server may automatically send the vehicle image data to a user platform when it is found that a vehicle corresponding to certain vehicle image data is likely to have vehicle violations, the user platform can separate the image information of the vehicle in the vehicle image data from the unique identification information of at least one WiFi terminal after obtaining the vehicle image data, i.e., extract unique identification information of at least one WiFi terminal from the vehicle image data, find out a vehicle corresponding to the unique identification information of at least one WiFi terminal is likely to have vehicle violations based on the extracted unique identification information of at least one WiFi terminal, and determine the vehicle image data corresponding to the unique identification information of the at least one WiFi terminal need to be queried, for the unique identification information of each WiFi terminal among the unique identification information of at least one WiFi terminal, the user platform sends a query request message for vehicle image data that carries the unique identification information of this WiFi terminal to the data server.

Step 406, the data server obtaining each piece of the vehicle image data corresponding to the unique identification information based on the unique identification information carried in a query request message for vehicle image data and each piece of the vehicle image data containing unique identification information stored in an image database and providing each piece of the vehicle image data corresponding to the unique identification information to a user. If the data server sends each piece of vehicle image data to a user platform, and a user can obtain each piece of the vehicle image data on the user platform, so that the user can select clearer vehicle image data from multiple pieces of image information of the vehicle, and judge whether the vehicle has vehicle violations based on the vehicle image data or identify the detailed information of the vehicle based on this piece of image information.

For example, unique identification information carried in a query request message for vehicle image data is the unique identification information of the WiFi terminal 1, and each piece of the vehicle image data stored in the image database for the unique identification information of each WiFi terminal is as shown in Table 3, then the data server queries Table 3 through the unique identification information of the WiFi terminal 1 so as to obtain that the vehicle image data corresponding to the unique identification information of the WiFi terminal 1 are vehicle image data 1, vehicle image data 2 and vehicle image data 4. The vehicle image data 1, vehicle image data 2 and vehicle image data 4 are sent to the user platform by the data server and can be obtained by a user on the user platform, and the user can select clearer vehicle image data from the vehicle image data 1, vehicle image data 2 and vehicle image data 4.

In embodiments of the present application, after the data server obtaining each piece of vehicle image data corresponding to the unique identification information based on the unique identification information and pieces of vehicle image data containing unique identification information stored in an image database, the data server can also determine an image acquisition device which corresponds to each piece of vehicle image data corresponding to the unique identification information, and analyze trajectory information of the vehicle based on the order in which the determined image acquisition devices acquired pieces of vehicle image data corresponding to the unique identification information, and the installation locations of the determined image acquisition devices. For example, after the data server obtaining the vehicle image data 1, vehicle image data 2 and vehicle image data 4 corresponding to the unique identification information of the WiFi terminal 1, it is also possible to determine an image acquisition device 1 corresponding to the vehicle image data 1, an image acquisition device 2 corresponding to the vehicle image data 2, an image acquisition device 3 corresponding to the vehicle image data 4, wherein the vehicle image data carries geographical coordinate information of image acquisition devices and shooting time information when the WiFi terminal is captured. Assuming that the image acquisition device 1 first acquires the vehicle image data 1, and then the image acquisition device 2 acquires the vehicle image data 2, after that the image acquisition device 3 acquires vehicle image data 4, then the trajectory information of the WiFi terminal 1 is the trajectory from location of the image acquisition device 1 to location of the image acquisition device 2 and to location of the image acquisition device 3.

In embodiments of the present application, the vehicle image data can further include information about license plate numbers, after analyzing and obtaining the trajectory of the WiFi terminal 1, it is also possible to analyze the trajectory of a vehicle associated with the WiFi terminal 1 in combination with information about license plate numbers in various vehicle image data. The data server can obtain each piece of the vehicle image data corresponding to the information about license plate numbers and provide the same to a user, its process will not be repeatedly described in detail.

Based on the above technical solution, when compared to the prior art, embodiments of the present application at least have the following advantages: in the embodiments of the present application, by arranging a WiFi detector on an image acquisition device, the image acquisition device obtains unique identification information of at least one WiFi terminal located within the WiFi detection area of the image acquisition device when acquiring image information of the vehicle, and combines the image information of the vehicle and the unique identification information of at least one WiFi terminal into vehicle image data, such that the data server can correlate multiple pieces of image information of the vehicle based on the unique identification information in the vehicle image data, and provide multiple pieces of image information of the vehicle together to a user, so that the user can select clearer image data from multiple pieces of image information of the vehicle, and judge whether the vehicle has vehicle violations based on this piece of image information or identify the detailed information of the vehicle based on this piece of image information.

Fourth Embodiment

Figure 5:
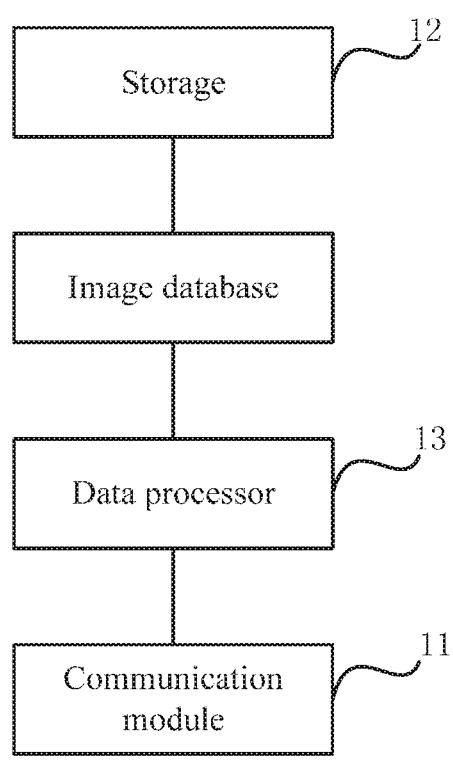
FIG. 5 is a schematic structural diagram of a data server provided in the fourth embodiment of the present application.

Based on the same inventive concept as the method described above, embodiments of the present application further provide a data server applicable to a vehicle image data acquisition system, as shown in FIG. 5, the data server includes:

a communication module 11, electrically connected with a data processor and used for receiving a query request message for vehicle image data which carries unique identification information of a WiFi terminal, and informing a data processor of the unique identification information. Wherein, the unique identification information of the WiFi terminal includes but is not limited to the MAC address of the WiFi terminal;

Wherein, the communication module can communicate with the image acquisition device in a wired mode or in a wireless mode, and the communication module can be a data transceiver with receiving and transmitting capabilities;

a storage 12, electrically connected with an image database and used for storing each piece of the vehicle image data containing the unique identification information in the image database.

Wherein, the vehicle image data stored in the image database are sent by an image acquisition device to the data server after acquiring the vehicle image data, the vehicle image data acquired by the image acquisition device include image information of the vehicle, and the unique identification information of at least one WiFi terminal obtained using a preset WiFi detector when acquiring the image information of the vehicle.

Wherein, the storage can be a hard disk, memory and so on with storage capability.

a data processor 13, electrically connected with the communication module 11 and the image database respectively and used for receiving the unique identification information from the communication module, and after receiving the unique identification information, querying each piece of the vehicle image data, stored in the image database, containing the unique identification information using the unique identification information to obtain each piece of the vehicle image data corresponding to the unique identification information, and providing each piece of the vehicle image data to a user.

Wherein, the data processor can be a CPU (central processing unit) with processing capability.

In embodiments of the present application, the storage 12 is used for analyzing the vehicle image data from the image acquisition device to obtain each piece of the unique identification information; for each piece of unique identification information, judging whether this piece of unique identification information is stored in the image database; if so, storing the vehicle image data for this piece of unique identification information; otherwise, storing this piece of unique identification information in the image database, and storing the vehicle image data for this piece of unique identification information.

The data processor 13 is further used for, after obtaining each piece of vehicle image data corresponding to the unique identification information based on the unique identification information and pieces of vehicle image data containing unique identification information stored in an image database, determining an image acquisition device which corresponds to each piece of vehicle image data corresponding to the unique identification information, and analyzing trajectory information of the vehicle based on the order in which the determined image acquisition devices acquired pieces of vehicle image data corresponding to the unique identification information, and the installation locations of the determined image acquisition devices.

Wherein, various modules of the device in the present application can be integrated into a whole or can be separately deployed. The modules described above can be combined into one module, or can be further split into multiple sub-modules.

Fifth Embodiment

Figure 6:
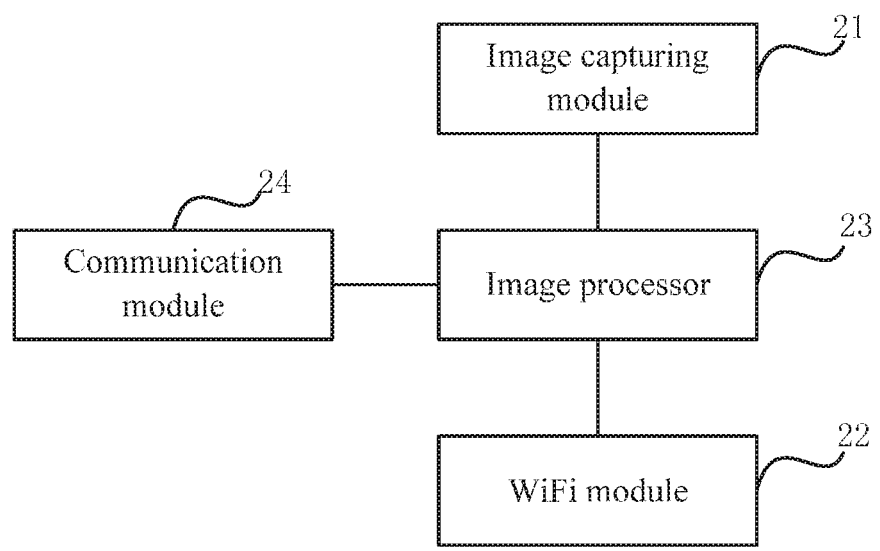
FIG. 6 is a schematic structural diagram of an image acquisition device provided in the fifth embodiment of the present application.

Based on the same inventive concept as the method described above, embodiments of the present application further provide an image acquisition device applicable to a vehicle image data acquisition system, as shown in FIG. 6, the image acquisition device includes:

an image capturing module 21, which is electrically connected with an image processor and used for acquiring image information of the vehicle and informing an image processor of the image information of the vehicle, wherein the image capturing module can be a camera with image capturing function, or a hardware processing circuit with image capturing function;

a WiFi detector 22, electrically connected with the image processor and used for obtaining unique identification information of at least one WiFi terminal currently located within the WiFi detection area of the WiFi detector and informing the image processor of the unique identification information of the at least one WiFi terminal. Wherein, the WiFi detector can be a server-side WiFi detector, such as a router-side WiFi detector. This WiFi detector, after receiving a broadcast message from a WiFi terminal, may not response to the WiFi terminal and not provide WiFi services for the WiFi terminal, as long as it can analyze this broadcast message to obtain unique identification information of the WiFi terminal carried in this broadcast message.

In embodiments of the present application, the unique identification information of the WiFi terminal includes but is not limited to the media access control MAC address of the WiFi terminal.

An image processor 23, which is electrically connected with the image capturing module, the WiFi detector and the communication module respectively, and used for receiving the image information of the vehicle from the image capturing module, receiving the unique identification information of the at least one WiFi terminal from the WiFi detector, correlating the acquired image information of the vehicle with the unique identification information of the at least one WiFi terminal obtained when acquiring the image information so as to generate vehicle image data, and informing a communication module of the vehicle image data.

Wherein, the image processor can be a CPU with processing capability.

A communication module 24, which is electrically connected with the image processor and used for receiving the vehicle image data from the image processor, and sending the vehicle image data to the data server, so that the data server stores each piece of the vehicle image data containing the unique identification information in an image database.

Wherein, the communication module can communicate with the data server in a wired mode or in a wireless mode, and the communication module can be a data transceiver with receiving and transmitting capabilities.

In embodiments of the present application, the image processor 23 is used for determining acquisition moment when the image information of the vehicle is acquired, and determining obtainment moment when the unique identification information of at least one WiFi terminal is obtained, when the difference between the acquisition moment and the obtainment moment does not exceed a preset threshold, correlating the acquired image information of the vehicle with the obtained unique identification information of the at least one WiFi terminal, so as to generate vehicle image data.

The image processor 23 is used for, when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data, or when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

Wherein, various modules of the device in the present application can be integrated into a whole or can be separately deployed. The modules described above can be combined into one module, or can be further split into multiple sub-modules.

Sixth Embodiment

Based on the same inventive concept as the method described above, embodiments of the present application further provide a system for providing vehicle image data, which includes:

an image acquisition device, used for acquiring image information of a vehicle, and obtaining unique identification information of at least one WiFi terminal currently located within the WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information so as to generate vehicle image data, and sending the vehicle image data to a data server;

the data server, used for, after receiving the vehicle image data, storing the vehicle image data in an image database, for unique identification information of each WiFi terminal contained in the vehicle image data; upon receiving a query request message for vehicle image data which carries the unique identification information of the WiFi terminal, obtaining each piece of vehicle image data corresponding to the unique identification information based on the unique identification information and pieces of vehicle image data containing unique identification information stored in an image database, and providing each piece of vehicle image data corresponding to the unique identification information to a user.

The system further includes a user platform, which is used for obtaining unique identification information of the WiFi terminal to be queried, and adding the unique identification information of the WiFi terminal to the query request message for vehicle image data, and sending the added query request message for vehicle image data to the data server.

In embodiments of the present application, the image acquisition device includes:

an image capturing module, used for acquiring image information of the vehicle and informing an image processor of the image information of the vehicle; a WiFi detector, used for obtaining unique identification information of at least one WiFi terminal currently located within the WiFi detection area of the WiFi detector and informing the image processor of the unique identification information of the at least one WiFi terminal;

the image processor, used for receiving the image information of the vehicle from the image capturing module, receiving the unique identification information of the at least one WiFi terminal from the WiFi detector, and correlating the acquired image information of the vehicle with the unique identification information of the at least one WiFi terminal obtained when acquiring the image information so as to generate vehicle image data, and informing a first communication module of the vehicle image data;

the first communication module, used for receiving the vehicle image data from the image processor and sending the vehicle image data to a data server.

Further, the image processor is used for determining acquisition moment when the image information of the vehicle is acquired, and determining obtainment moment when the unique identification information of at least one WiFi terminal is obtained, when the difference between the acquisition moment and the obtainment moment does not exceed a preset threshold, correlating the acquired image information of the vehicle with the obtained unique identification information of the at least one WiFi terminal, so as to generate vehicle image data.

Further, the image processor is used for, when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

In embodiments of the present application, the data server includes:

a second communication module, used for receiving a query request message for vehicle image data which carries unique identification information of a wireless fidelity WiFi terminal, and informing a data processor of the unique identification information;

a storage, used for storing each piece of the vehicle image data containing the unique identification information in an image database; wherein the vehicle image data stored in the image database are sent by an image acquisition device to the data server after acquiring the vehicle image data, the vehicle image data acquired by the image acquisition device include image information of a vehicle, and the unique identification information of at least one WiFi terminal obtained using a preset WiFi detector when acquiring the image information of the vehicle;

a data processor, used for receiving the unique identification information from the communication module, and after receiving the unique identification information, querying each piece of the vehicle image data containing the unique identification information stored in the image database using the unique identification information to obtain each piece of the vehicle image data corresponding to the unique identification information, and providing each piece of the vehicle image data to a user.

Further, the storage is used for analyzing the vehicle image data from the image acquisition device to obtain each piece of the unique identification information; for each piece of unique identification information, judging whether this piece of unique identification information is stored in the image database; if so, storing the vehicle image data for this piece of unique identification information; otherwise, storing this piece of unique identification information in the image database, and storing the vehicle image data for this piece of unique identification information.

Further, the data processor is further used for, after obtaining each piece of the vehicle image data corresponding to the unique identification information based on the unique identification information and each piece of the vehicle image data containing the unique identification information stored in an image database, determining an image acquisition device which corresponds to each piece of vehicle image data corresponding to the unique identification information, and analyzing trajectory information of the vehicle based on the order in which the determined image acquisition devices acquired pieces of vehicle image data corresponding to the unique identification information, and the installation locations of the determined image acquisition devices.

Embodiments of the present application provide an application program, wherein the application program is used for implementing the method for providing vehicle image data provided by embodiments of the present application when being executed.

In a specific implementation of the present application, the method for providing vehicle image data applicable to a data server in a vehicle image data acquisition system includes the following steps:

receiving a query request message for vehicle image data which carries unique identification information of a wireless fidelity WiFi terminal;

obtaining each piece of vehicle image data corresponding to the unique identification information based on the unique identification information and pieces of vehicle image data containing unique identification information stored in an image database, and providing each piece of vehicle image data corresponding to the unique identification information to a user;

wherein, vehicle image data stored in the image database are sent by an image acquisition device after acquiring the vehicle image data, the vehicle image data acquired by the image acquisition device include image information of a vehicle, and the unique identification information of at least one WiFi terminal obtained using a preset WiFi detector when acquiring the image information of the vehicle.

In a specific implementation of the present application, the method for providing vehicle image data applicable to a vehicle image data acquisition system includes the following steps:

an image acquisition device acquiring image information of a vehicle, obtaining unique identification information of at least one WiFi terminal currently located within the WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information, so as to generate vehicle image data, and sending the vehicle image data to a data server;

after receiving the vehicle image data, the data server storing the vehicle image data in an image database, for unique identification information of each WiFi terminal contained in the vehicle image data;

upon receiving a query request message for vehicle image data which carries the unique identification information of the WiFi terminal, the data server obtaining each piece of vehicle image data corresponding to the unique identification information based on the unique identification information and pieces of vehicle image data containing unique identification information stored in an image database, and providing each piece of vehicle image data corresponding to the unique identification information to a user.

Embodiments of the present application provide a storage medium, wherein the storage medium is used for storing an application program, wherein the application program is used for implementing the method for providing vehicle image data provided by embodiments of the present application.

In a specific implementation of the present application, the method for providing vehicle image data applicable to a data server in a vehicle image data acquisition system includes the following steps:

receiving a query request message for vehicle image data which carries unique identification information of a wireless fidelity WiFi terminal;

obtaining each piece of vehicle image data corresponding to the unique identification information based on the unique identification information and pieces of vehicle image data containing unique identification information stored in an image database, and providing each piece of vehicle image data corresponding to the unique identification information to a user;

wherein, vehicle image data stored in the image database are sent by an image acquisition device after acquiring the vehicle image data, the vehicle image data acquired by the image acquisition device include image information of a vehicle, and the unique identification information of at least one WiFi terminal obtained using a preset WiFi detector when acquiring the image information of the vehicle.

In a specific implementation of the present application, the method for providing vehicle image data applicable to a vehicle image data acquisition system includes the following steps:

an image acquisition device acquiring image information of a vehicle, obtaining unique identification information of at least one WiFi terminal currently located within the WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information, so as to generate vehicle image data, and sending the vehicle image data to a data server;

after receiving the vehicle image data, the data server storing the vehicle image data in an image database, for unique identification information of each WiFi terminal contained in the vehicle image data;

upon receiving a query request message for vehicle image data which carries the unique identification information of the WiFi terminal, the data server obtaining each piece of vehicle image data corresponding to the unique identification information based on the unique identification information and pieces of vehicle image data containing unique identification information stored in an image database, and providing each piece of vehicle image data corresponding to the unique identification information to a user.

Embodiments of the present application provide an application program, which is used for implementing the method for acquiring vehicle image data provided by embodiments of the present application when being executed. Wherein, the method for acquiring vehicle image data applicable to an image acquisition device in a vehicle image data acquisition system includes the following steps:

acquiring image information of the vehicle, and obtaining unique identification information of at least one WiFi terminal currently located within the WiFi detection area of a preset wireless fidelity WiFi detector using the WiFi detector when acquiring the image information of the vehicle;

correlating the acquired image information of the vehicle with unique identification information of the at least one WiFi terminal obtained when acquiring the image information, so as to generate vehicle image data;

sending the vehicle image data to a data server, such that the data server stores each piece of the vehicle image data containing unique identification information in an image database.

Embodiments of the present application provide a storage medium, wherein the storage medium is used for storing an application program, wherein the application program is used for implementing the method for acquiring vehicle image data provided by embodiments of the present application. Wherein, the method for acquiring vehicle image data applicable to an image acquisition device in a vehicle image data acquisition system includes the following steps:

acquiring image information of a vehicle, and obtaining unique identification information of at least one WiFi terminal currently located within the WiFi detection area of a preset wireless fidelity WiFi detector using the WiFi detector when acquiring the image information of the vehicle;

correlating the acquired image information of the vehicle with unique identification information of the at least one WiFi terminal obtained when acquiring the image information, so as to generate vehicle image data;

sending the vehicle image data to a data server, such that the data server stores each piece of the vehicle image data containing unique identification information in an image database.

The embodiments of a system, a device, a server, an application program and a storage medium are briefly described and reference can be made to the description of the embodiments of a method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements include not only those elements listed, but also other elements not listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present application, and not indented to limit the present application. Any modifications, alternatives, improvements or the like within the spirit and principle of the present application shall be included in the protection scope of the present application.

The invention claimed is:

1. A method for providing vehicle image data, which is applicable to a data server in a vehicle image data acquisition system and comprises the following steps:

receiving a query request message for vehicle image data which carries unique identification information of a wireless fidelity WiFi terminal;

obtaining each piece of vehicle image data corresponding to the unique identification information based on the unique identification information and pieces of vehicle image data containing unique identification information stored in an image database, and providing each piece of vehicle image data corresponding to the unique identification information to the user;

wherein, vehicle image data stored in the image database is sent by an image acquisition device after acquiring the vehicle image data, and the vehicle image data acquired by the image acquisition device comprises image information of a vehicle, and unique identification information of at least one WiFi terminal obtained using a preset WiFi detector when acquiring the image information of the vehicle, such that the data server correlates multiple pieces of image information of the vehicle based on the unique identification information in the vehicle image data, and provides multiple pieces of image information of the vehicle together to the user, wherein the unique identification information is carried in WiFi signals that are sent periodically by the at least one WiFi terminal, wherein after receiving the WiFi signals from the at least one WiFi terminal, the preset WiFi detector only obtain the unique identification information of the at least one WiFi terminal from the WiFi signals, as a part of the vehicle image data; the WiFi signals are only used to carry the unique identification information;

wherein when a difference between an acquisition moment of acquiring the image information of the vehicle and an obtainment moment of obtaining the unique identification information of at least one WiFi terminal does not exceed a preset threshold, the acquired image information of the vehicle is correlated with the obtained unique identification information of the at least one WiFi terminal, to form vehicle image data.

2. The method according to claim 1, wherein, the process of storing vehicle image data in the image database comprises:

analyzing the vehicle image data from the image acquisition device to obtain each piece of unique identification information;

for each piece of unique identification information, judging whether this piece of unique identification information is stored in the image database; if so, storing the vehicle image data for this piece of unique identification information; otherwise, storing this piece of unique identification information in the image database, and storing the vehicle image data for this piece of unique identification information.

3. The method according to claim 1, wherein, after obtaining each piece of vehicle image data corresponding to the unique identification information based on the unique identification information and pieces of vehicle image data containing unique identification information stored in an image database, the method further comprises:

determining an image acquisition device which corresponds to each piece of vehicle image data corresponding to the unique identification information, and analyzing trajectory information of the vehicle based on installation locations of the determined image acquisition devices and the order in which the determined image acquisition devices acquired pieces of vehicle image data corresponding to the unique identification information.

4. A method for acquiring vehicle image data, which is applicable to an image acquisition device in a vehicle image data acquisition system and comprises the following steps:

acquiring image information of a vehicle, and obtaining unique identification information of at least one WiFi terminal currently located within a WiFi detection area of a preset wireless fidelity WiFi detector using the WiFi detector when acquiring the image information of the vehicle, the unique identification information is carried in WiFi signals that are sent periodically by the at least one WiFi terminal;

correlating the acquired image information of the vehicle with unique identification information of the at least one WiFi terminal obtained when acquiring the image information, so as to generate vehicle image data;

sending the vehicle image data to a data server, such that the data server stores, in an image database, each piece of vehicle image data containing unique identification information, wherein the vehicle image data comprises the image information of the vehicle, and the unique identification information of the at least one WiFi terminal, such that the data server correlates multiple pieces of image information of the vehicle based on the unique identification information in the vehicle image data, and provides multiple pieces of image information of the vehicle together to a user, wherein after receiving the WiFi signals from the at least one WiFi terminal, the preset WiFi detector only obtain the unique identification information of the at least one WiFi terminal from the WiFi signals, as a part of the vehicle image data; the WiFi signals are only used to carry the unique identification information;

wherein the process of correlating the acquired image information of the vehicle with unique identification information of the at least one WiFi terminal obtained when acquiring the image information so as to generate vehicle image data, comprises:

determining acquisition moment when the image information of the vehicle is acquired, and determining obtainment moment when the unique identification information of at least one WiFi terminal is obtained; when the difference between the acquisition moment and the obtainment moment does not exceed a preset threshold, correlating the acquired image information of the vehicle with the obtained unique identification information of the at least one WiFi terminal, so as to generate vehicle image data.

5. The method according to claim 4, wherein, the process of correlating the acquired image information of the vehicle with unique identification information of the at least one WiFi terminal obtained when acquiring the image information so as to generate vehicle image data, comprises:

when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

6. A data server, which is applicable to a vehicle image data acquisition system, wherein the data server comprises:

a communication module, used for receiving a query request message for vehicle image data which carries unique identification information of a wireless fidelity WiFi terminal, and informing a data processor of the unique identification information;

a storage, used for storing each piece of vehicle image data containing unique identification information in an image database; wherein vehicle image data stored in the image database are sent by an image acquisition device to the data server after acquiring the vehicle image data, the vehicle image data acquired by the image acquisition device comprise image information of a vehicle, and unique identification information of at least one WiFi terminal obtained using a preset WiFi detector when acquiring the image information of the vehicle, such that the data server correlates multiple pieces of image information of the vehicle based on the unique identification information in the vehicle image data, and provides multiple pieces of image information of the vehicle together to the user, wherein the unique identification information is carried in WiFi signals that are sent periodically by the at least one WiFi terminal;

a data processor, used for receiving the unique identification information from the communication module, and after receiving the unique identification information, querying each piece of the vehicle image data containing unique identification information stored in the image database, using the unique identification information to obtain each piece of vehicle image data corresponding to the unique identification information, and providing each piece of vehicle image data corresponding to the unique identification information to the user, wherein after receiving the WiFi signals from the at least one WiFi terminal, the preset WiFi detector only obtain the unique identification information of the at least one WiFi terminal from the WiFi signals, as a part of the vehicle image data; the WiFi signals are only used to carry the unique identification information;

wherein when a difference between an acquisition moment of acquiring the image information of the vehicle and an obtainment moment of obtaining the unique identification information of at least one WiFi terminal does not exceed a preset threshold, the acquired image information of the vehicle is correlated with the obtained unique identification information of the at least one WiFi terminal, to form vehicle image data.

7. The data server according to claim 6, wherein,
the storage is used for analyzing the vehicle image data from the image acquisition device to obtain each piece of the unique identification information; for each piece of unique identification information, judging whether this piece of unique identification information is stored in the image database; if so, storing the vehicle image data for this piece of unique identification information; otherwise, storing this piece of unique identification information in the image database, and storing the vehicle image data for this piece of unique identification information.

8. The data server according to claim 6, wherein, the data processor is further used for, after obtaining each piece of vehicle image data corresponding to the unique identification information based on the unique identification information and pieces of vehicle image data containing unique identification information stored in an image database, determining an image acquisition device which corresponds to each piece of vehicle image data corresponding to the unique identification information, and analyzing trajectory information of the vehicle based on installation locations of the determined image acquisition devices and the order in which the determined image acquisition devices acquired pieces of vehicle image data corresponding to the unique identification information.

9. An image acquisition device, which is applicable to a vehicle image data acquisition system and comprises:
an image capturing module, used for acquiring image information of a vehicle and informing an image processor of the image information of the vehicle;
a wireless fidelity WiFi detector, used for obtaining unique identification information of at least one WiFi terminal currently located within the WiFi detection area of the WiFi detector and informing the image processor of the unique identification information of the at least one WiFi terminal, wherein the unique identification information is carried in WiFi signals that are sent periodically by the at least one WiFi terminal;
an image processor, used for receiving the image information of the vehicle from the image capturing module, receiving unique identification information of the at least one WiFi terminal from the WiFi detector, correlating the acquired image information of the vehicle with unique identification information of the at least one WiFi terminal obtained when acquiring the image information so as to generate vehicle image data, and informing a communication module of the vehicle image data;
the communication module, used for receiving the vehicle image data from the image processor, and sending the vehicle image data to a data server, such that the data server stores each piece of vehicle image data containing unique identification information in an image database,
wherein the vehicle image data comprises the image information of the vehicle, and the unique identification information of the at least one WiFi terminal, such that the data server correlates multiple pieces of image information of the vehicle based on the unique identification information in the vehicle image data, and provides multiple pieces of image information of the vehicle together to a user, wherein after receiving the WiFi signals from the at least one WiFi terminal, the preset WiFi detector only obtain the unique identification information of the at least one WiFi terminal from the WiFi signals, as a part of the vehicle image data; the WiFi signals are only used to carry the unique identification information;
wherein the image processor is further used for determining acquisition moment when the image information of the vehicle is acquired, and determining obtainment moment when the unique identification information of at least one WiFi terminal is obtained; when the difference between the acquisition moment and the obtainment moment does not exceed a preset threshold, correlating the acquired image information of the vehicle with the obtained unique identification information of the at least one WiFi terminal, so as to generate vehicle image data.

10. The image acquisition device according to claim 9, wherein,
the image processor is used for, when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or
when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

11. A system for providing vehicle image data, comprising:
an image acquisition device, used for acquiring image information of a vehicle, and obtaining unique identification information of at least one WiFi terminal currently located within a WiFi detection area of a preset wireless fidelity WiFi detector using the WiFi detector when acquiring the image information of the vehicle, correlating the acquired image information of the vehicle with the unique identification information of the at least one WiFi terminal obtained when acquiring the image information so as to generate vehicle image data, and sending the vehicle image data to a data server, wherein the unique identification information is carried in WiFi signals that are sent periodically by the at least one WiFi terminal;
the data server, used for, after receiving the vehicle image data, storing the vehicle image data in an image database, for unique identification information of each WiFi terminal contained in the vehicle image data; upon receiving a query request message for vehicle image data which carries the unique identification information of the WiFi terminal, obtaining each piece of vehicle image data corresponding to the unique identification information based on the unique identification information and pieces of vehicle image data containing unique identification information stored in an image database, and providing each piece of vehicle image data corresponding to the unique identification information to a user, wherein the vehicle image data comprises the image information of the vehicle, and the unique identification information of the at least one WiFi terminal, such that the data server correlates multiple pieces of image information of the vehicle based on the unique identification information in the vehicle image data, and provides multiple pieces of image information of the vehicle together to the user, wherein after receiving the WiFi signals from the at least one WiFi terminal, the preset WiFi detector only obtain the unique identification information of the at least one WiFi terminal from the WiFi signals, as a part of the vehicle image data; the WiFi signals are only used to carry the unique identification information;

wherein when a difference between an acquisition moment of acquiring the image information of the vehicle and an obtainment moment of obtaining the unique identification information of at least one WiFi terminal does not exceed a preset threshold, the acquired image information of the vehicle is correlated with the obtained unique identification information of the at least one WiFi terminal, to form vehicle image data.

12. The system according to claim 11, wherein the system further comprises:
a user platform, used for obtaining unique identification information of a WiFi terminal to be queried, and adding the unique identification information of the WiFi terminal to the query request message for vehicle image data, and sending the added query request message for vehicle image data to the data server.

13. The system according to claim 11, wherein the image acquisition device comprises:
an image capturing module, used for acquiring image information of the vehicle and informing an image processor of the image information of the vehicle;
a WiFi detector, used for obtaining unique identification information of at least one WiFi terminal currently located within the WiFi detection area of the WiFi detector and informing the image processor of the unique identification information of the at least one WiFi terminal;
an image processor, used for receiving the image information of the vehicle from the image capturing module, receiving unique identification information of the at least one WiFi terminal from the WiFi detector, and correlating the acquired image information of the vehicle with the unique identification information of the at least one WiFi terminal obtained when acquiring the image information so as to generate vehicle image data, and informing a first communication module of the vehicle image data;
the first communication module, used for receiving the vehicle image data from the image processor and sending the vehicle image data to a data server.

14. The system according to claim 13, wherein
the image processor is used for determining acquisition moment when the image information of the vehicle is acquired, and determining obtainment moment when the unique identification information of at least one WiFi terminal is obtained; when the difference between the acquisition moment and the obtainment moment does not exceed a preset threshold, correlating the acquired image information of the vehicle with the obtained unique identification information of the at least one WiFi terminal, so as to generate vehicle image data.

15. The system according to claim 13, wherein
the image processor is used for, when acquiring the image information, if a WiFi signal corresponding to the unique identification information of the at least one WiFi terminal is detected, correlating the acquired image information of the vehicle with the unique identification information of the at least one WiFi terminal obtained when acquiring the image information, so as to generate vehicle image data; or
when acquiring the image information, if a WiFi signal corresponding to the unique identification information of the at least one WiFi terminal is detected and the intensity of the WiFi signal corresponding to the unique identification information of the at least one WiFi terminal is greater than a preset threshold, correlating the acquired image information of the vehicle with the unique identification information of the at least one WiFi terminal obtained when acquiring the image information, so as to generate vehicle image data.

16. The system according to claim 11, wherein the data server comprises:
a second communication module, used for receiving a query request message for vehicle image data which carries unique identification information of a wireless fidelity WiFi terminal, and informing a data processor of the unique identification information;
a storage, used for storing each piece of the vehicle image data containing the unique identification information in an image database; wherein vehicle image data stored in the image database are sent by an image acquisition device to the data server after acquiring the vehicle image data, the vehicle image data acquired by the image acquisition device comprise image information of a vehicle, and the unique identification information of at least one WiFi terminal obtained using a preset WiFi detector when acquiring the image information of the vehicle;
a data processor, used for receiving the unique identification information from the communication module, and after receiving the unique identification information, querying each piece of the vehicle image data containing the unique identification information stored in the image database, using the unique identification information to obtain each piece of the vehicle image data corresponding to the unique identification information, and providing each piece of the vehicle image data corresponding to the unique identification information to a user.

17. The system according to claim 16, wherein,
the storage is used for analyzing the vehicle image data from the image acquisition device to obtain each piece of the unique identification information; for each piece of unique identification information, judging whether this piece of unique identification information is stored in the image database; if so, storing the vehicle image data for this piece of unique identification information; otherwise, storing this piece of unique identification information in the image database, and storing the vehicle image data for this piece of unique identification information.

18. The system according to claim 16, wherein
the data processor is further used for, after obtaining each piece of vehicle image data corresponding to the unique identification information based on the unique identification information and pieces of vehicle image data containing unique identification information stored in an image database, determining an image acquisition device which corresponds to each piece of vehicle image data corresponding to the unique identification information, and analyzing trajectory information of the vehicle based on installation locations of the determined image acquisition devices and the order in which the determined image acquisition devices acquired pieces of vehicle image data corresponding to the unique identification information.

\* \* \* \* \*